UNITED STATES PATENT OFFICE.

CYRIL VINCENT BROWNE, OF MOUNT EDEN, AUCKLAND, NEW ZEALAND.

BEVERAGE.

1,310,277. Specification of Letters Patent. Patented July 15, 1919.

No Drawing. Application filed September 14, 1918. Serial No. 254,107.

*To all whom it may concern:*

Be it known that I, CYRIL VINCENT BROWNE, a citizen of the Dominion of New Zealand, and residing at Cromwell street, Mount Eden, Auckland, in the Provincial District of Auckland, in the Dominion of New Zealand, have invented certain new and useful Improvements in Beverages, of which the following is a specification.

This invention relates to beverages and provides a beverage having a taste closely resembling the taste of coffee, compared with which the beverage is cheaper and more wholesome.

The invention consists of bran and brown sugar, which are prepared by spreading the bran on a tray and covering the same with the brown sugar. The bran and sugar are then heated until the sugar boils. After being allowed to cool the bran and sugar are removed in lump form and ground to powder of the fineness of coffee, when it is ready for use. An amount of the ground bran and sugar is taken according to the amount and strength of beverage required, and is put into a saucepan with the desired proportion of milk and water and is then boiled, or the amount of ground bran and sugar is boiled with water and milk afterward added to suit different tastes.

Chicory may be added as desired to suit the taste.

The proportions by measurement of bran and sugar are:—

Bran ------------------ 2 parts
Sugar ----------------- 1 part

What I do claim and desire to secure by Letters Patent of the United States is:—

1. The herein described process of producing a water soluble beverage constituent, which consists in arranging bran in a relatively thin flat mass having a substantial area, applying brown sugar in sufficient quantity to cover the top of the mass to a thickness of the bran and covering the latter, heating the mass thus arranged without the addition of water until the sugar boils whereby the sugar will gravitate into the mass of bran and become mixed therewith, allowing the mass to cool and harden, and grinding the hardened mass thus produced to provide a powder of suitable fineness.

2. The herein described process of producing a water soluble beverage constituent, which consists in arranging two parts of bran in a relatively thin flat mass having a substantial area, applying one part of brown sugar to the top of the mass of bran to cover the same, heating the mass thus arranged without the addition of water until the sugar boils whereby the sugar will gravitate into the mass of bran and become mixed therewith, allowing the mass to cool and harden, and grinding the hardened mass thus produced to provide a suitable powder.

In testimony whereof I have signed my name to this specification in the presence of two witnesses.

CYRIL VINCENT BROWNE.

Witnesses:
D. W. CONNELL,
D. E. RAPSON.

Copies of this patent may be obtained for five cents each, by addressing the "Commissioner of Patents, Washington, D. C."